(12) United States Patent
Kloppenburg

(10) Patent No.: US 11,056,847 B2
(45) Date of Patent: Jul. 6, 2021

(54) FASTENING CLAMP

(71) Applicant: Phoenix Contact GmbH & Co. KG, Blomberg (DE)

(72) Inventor: Christian Kloppenburg, Büren Wewelsburg (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 0 days.

(21) Appl. No.: 16/756,543

(22) PCT Filed: Sep. 10, 2018

(86) PCT No.: PCT/EP2018/074312
§ 371 (c)(1),
(2) Date: Apr. 16, 2020

(87) PCT Pub. No.: WO2019/076537
PCT Pub. Date: Apr. 25, 2019

(65) Prior Publication Data
US 2020/0295516 A1 Sep. 17, 2020

(30) Foreign Application Priority Data

Oct. 17, 2017 (DE) ...................... 10 2017 124 143.4

(51) Int. Cl.
*H01R 13/73* (2006.01)
*H01R 13/74* (2006.01)
*F16B 2/18* (2006.01)

(52) U.S. Cl.
CPC ............. *H01R 13/74* (2013.01); *F16B 2/185* (2013.01)

(58) Field of Classification Search
CPC ......... H01R 13/74; H01R 13/73; F16B 2/185; F16B 2/18; F16B 2/12; F16B 2/10; F16B 2/02; F16B 2/005
See application file for complete search history.

(56) References Cited

U.S. PATENT DOCUMENTS

| 5,613,876 | A | 3/1997 | Sakatani et al. |
| 5,899,763 | A | 5/1999 | Kajiura |

(Continued)

FOREIGN PATENT DOCUMENTS

| DE | 19801260 A1 | 7/1999 |
| DE | 20200974 U1 | 5/2003 |

*Primary Examiner* — Harshad C Patel
(74) *Attorney, Agent, or Firm* — David S. Safran; Roberts Calderon Safran & Cole, P.C.

(57) ABSTRACT

A fastening clamp for fixing a terminal block in a wall opening in a housing wall, having a clamp housing and at least one clamping element. The fastening clamp allows the terminal block to be mounted in and removed from a wall opening in a housing wall with a small width in that the clamping element has a resilient snap arm, having a foot region fastened to the clamp housing and a free end forming a clamping face, the snap arm extending along the side face of the clamp housing so that the clamping face acts on an edge of the wall opening when the fastening clamp is in the mounted state. A blocking element is displaceably mounted on the clamp housing for movement between a first position in which the resilient snap arm can be deflected, and a second position in which the blocking element cannot be deflected.

17 Claims, 12 Drawing Sheets

(56) References Cited

U.S. PATENT DOCUMENTS

| | | | | |
|---|---|---|---|---|
| 6,036,538 A | * | 3/2000 | Lin | F21V 21/002 |
| | | | | 362/249.01 |
| 6,146,213 A | * | 11/2000 | Yoon | H01R 9/2616 |
| | | | | 439/532 |
| 6,488,527 B2 | * | 12/2002 | Yoon | H01R 9/2675 |
| | | | | 439/441 |
| 7,473,124 B1 | | 1/2009 | Briant et al. | |
| 7,537,496 B2 | * | 5/2009 | Bentler | H01R 9/2491 |
| | | | | 439/532 |
| 7,753,739 B2 | * | 7/2010 | Bentler | H01R 9/26 |
| | | | | 439/709 |
| D717,734 S | * | 11/2014 | Habirov | D13/147 |
| 9,153,916 B2 | * | 10/2015 | Schloo | H01R 9/2633 |
| 9,407,019 B2 | * | 8/2016 | Falk | H01R 9/26 |
| 9,954,322 B2 | * | 4/2018 | Gebhardt | H01R 13/582 |
| 10,283,918 B2 | * | 5/2019 | Schyrocki | H01R 9/2408 |
| 10,361,497 B2 | * | 7/2019 | Kloppenburg | H01R 9/2666 |
| 2008/0106266 A1 | | 5/2008 | Diessel | |
| 2008/0302557 A1 | | 12/2008 | Giefers | |
| 2014/0329397 A1 | | 11/2014 | Schloo et al. | |
| 2015/0147909 A1 | | 5/2015 | Gebhardt et al. | |
| 2018/0261934 A1 | | 9/2018 | Kloppenburg et al. | |
| 2018/0287311 A1 | | 10/2018 | Houry et al. | |

* cited by examiner

FASTENING CLAMP

BACKGROUND OF THE INVENTION

Field of the Invention

The invention relates to a fastening clamp for securing a modular terminal block that consists of multiple modular terminals in a wall opening of a housing wall, with a terminal housing and with at least one clamping element, wherein the clamping element has a clamp surface. In addition, the invention also relates to a component that consists of two fastening clamps and multiple terminals that are arranged adjacent to one another.

Description of the Related Art

For many years now, electrical modular terminals have been used in the millions in the wiring of electrical units and devices. The clamps are frequently snapped onto support rails, a number of which can be arranged in a switch cabinet. In addition, modular terminals can also be fastened alone, however, or in general in multiples as modular terminal blocks in a wall opening, in particular in an opening in a switch cabinet wall. This has the advantage that the one side of the clamp, the operator side, is accessible from the outside of the switch cabinet, without the switch cabinet having to be opened, while the other side of the clamp, the connection side, is accessible only when the switch cabinet is open. Thus, it can be ensured that no unauthorized individual can get to the wiring and manipulate the latter.

Electrical modular terminals are in general connecting clamps, so that they have at least two line terminal elements, which are connected to one another electrically via an electrically-conductive connector bar, the busbar. In addition to this basic type of terminal, which is often also referred to as a through terminal, there are a large number of other terminal types, which are matched especially to the respective applications. As examples, protective-conductor terminals, knife disconnect terminals, and installation clamps can be mentioned.

In the switching, cutting, and regulating fields, disconnect-option through terminals are the standard. The disconnect option provided by the electrical modular terminal, i.e., the cut point provided in the busbar, makes it possible to insert various plugs with various functions into the terminal housing of the modular terminal, which then make contact with the busbar at the cut point. As plugs, in addition to simple partition plugs or through connectors, in particular test connectors can also be used, which test connectors can have special components and make possible a check of the proper function of the circuit that is connected to the modular terminal. Since electrical modular terminals are in general designed in the shape of a disk, in most cases they are plugged together with multiple other electrical modular terminals to form a modular terminal block. A number of test connectors corresponding to the number of modular terminals can then be plugged into one such modular terminal block. Modular terminals with cut points are used in particular for connecting current and voltage transformers. An important functional characteristic in this case consists in that a connected current transformer is short-circuited when the secondary circuit is separated from the load.

A modular terminal, a test connector, as well as a test clamping block that consists of a number of modular terminals that are arranged adjacent to one another and a corresponding number of test connectors are known from German Patent Application DE 10 2006 052 894 A1 and corresponding U.S. Patent Application Publication 2008/0106266 A1. The individual modular terminals in each case have two busbars, whose contact sections contact one another when the plug of a test connector is not inserted into the contact area that is formed by the contact sections. If the plug of a test connector is not completely inserted into the contact area, the two contact sections are separated from one another by the plug, wherein the current flow is then guided via the plug, so that a testing process can be performed. The modular terminal and the assigned test connector thus work according to the opener principle, since the connection between the two busbars of the modular terminal is opened when the plug, which has two metal sections that are insulated from one another, is plugged into the contact area.

Also, an electrical modular terminal in the form of a test clamp is known from German Patent Application DE 10 2011 113 333 A1 and corresponding U.S. Patent Application Publication 2014/0329397 A1. In the case of this modular terminal, two line terminal elements and two busbars are also arranged in the housing. The two busbars in each case in addition also have a second contact section in addition to a connection section and a first contact section. The first contact sections are separated from one another and connected to one another in an electrically-conductive manner via the plugs only in the case of the inserted plug, so that this modular terminal operates according to the closer principle. In addition, two additional busbar pieces are also arranged in the housing, wherein in at least one of the busbar pieces, a recess is formed for plugging in one leg of a jumper. In each case, one of the busbar pieces is assigned here to one of the busbars, so that the second contact section of a busbar contacts the assigned busbar piece because of the spring force of the busbar when no plug is inserted.

The busbars of the modular terminal are then connected in an electrically-conductive manner in each case with its connection section to the line terminal element and with its second contact section to the respective busbar piece. If a plug of a test connector is inserted into the contact area, the two busbars are thus deflected in such a way that the second contact section of a busbar is separated from the assigned busbar piece. Thus, the electrical connection between a line terminal element and the assigned busbar piece is then interrupted.

Regardless of how the modular terminals are designed in detail and of whether connecting terminals or through terminals have a disconnect option, such modular terminals are frequently arranged in multiples adjacent to one another and are connected mechanically to one another, so that together they form a modular terminal block. The latter are in this case frequently fastened in a wall opening of a housing wall, for example a switch cabinet door or a switch cabinet wall.

Known from German Patent DE 198 01 260 C2 is a wall-lead-through terminal, in which a one-piece terminal housing is plugged through the wall opening up to a stop and then a clip-shaped ratchet lever is pushed onto the piece that is guided through the wall opening. The ratchet lever locks with two opposite sides of the housing, so that the housing wall is secured between the stop on one side and the ratchet lever on the other side. In this case, the housing wall has to be accessible on both sides for assembly.

German Utility Model DE 202 00 974 U1 also discloses a wall-lead-through terminal, in which the one-piece terminal housing is plugged in through the wall opening of a housing. When plugging the terminal housing through the wall opening, spring catches that are provided on the top and the bottom of the housing are pushed back through the upper edge or the lower edge of the wall opening. For final securing of the lead-through terminal in the wall opening, the spring catches must be prevented from springing back again by a locking slide feed, which can be operated only from the interior of the housing, while the lead-through terminal first has to be inserted from the exterior of the wall opening, so that access to the two sides of the housing wall during assembly is also necessary here. In addition, the two above-described wall-lead-through terminals are not provided for this purpose and are also unsuitable for fastening a modular terminal block that consists of multiple modular terminals in a wall opening of a housing wall.

German Patent Application DE 10 2012 011 676 A1 and corresponding U.S. Patent Application Publication 2015/0147909 A1, from which the invention proceeds, discloses a fastening clamp for a modular terminal block that consists of multiple terminals, which makes possible a one-sided assembly and disassembly of the modular terminal block in a wall opening of a housing wall. To this end, in the terminal housing of the known fastening clamp, a clamping element is movably arranged that has a clamping chamfer, which projects through an opening into the terminal housing. Using a screw, the clamping element can be brought into a clamping position, in which in the assembled state of the fastening clamp, the clamping chamfer presses against the upper inside edge of the wall opening.

The assembly and disassembly of the fastening clamp in the wall opening is carried out in this case only from one side, namely from the side from which the screw for moving the clamping element can be actuated. From this side, the fastening clamp is first inserted into the wall opening, before the fastening clamp is secured by bringing the clamping element into the clamping position in the wall opening. So that a sufficiently secure fastening of the clamp in the wall opening is carried out, the clamp surface between the clamping chamfer and the upper inside edge of the wall opening must not be too small. This means that the clamping element must have a certain extension perpendicular to the extension direction of the terminal housing, i.e., the clamping element must have a certain minimum width. This has the effect that even the terminal housing, in which the clamping element is movably arranged, must have a certain minimum width. In particular, in the case of a modular terminal block that consists of multiple relatively narrow modular terminals, this has the effect that a fastening clamp is wider than the individual modular terminals. So that a modular terminal block with a certain number of modular terminals can be assembled in a wall opening, the wall opening must then have a width that is considerably larger than the width of the clean modular terminal block.

SUMMARY OF THE INVENTION

The object of this invention is therefore to make available a fastening option for a modular terminal block that consists of multiple modular terminals, which makes possible a simple assembly and disassembly of the modular terminal block in a wall opening of a housing wall, wherein the installation space that is required for this purpose is to be as small as possible, so that a modular terminal block can also be fastened in a relatively narrow wall opening.

In the case of the above-described fastening clamp, this object is achieved according to the invention by the clamping element being a sprung ratchet arm that is fastened at its foot area to the terminal housing and the clamp surface is formed at its free end, wherein the ratchet arm extends along the lateral surface of the terminal housing. In the assembled state of the fastening clamp, the clamp surface then acts against one edge of the wall opening, in which it is in particular the opposite lateral inside edge of the wall opening. Because of the design of the at least one clamping element as a sprung ratchet arm, which extends approximately parallel to the lateral surface of the terminal housing and whose free end is designed as a clamp surface, the clamping is not carried out on the upper or lower inside edge of the wall opening, but rather on a lateral inside edge of the wall opening. The clamp surface of the ratchet arm can thus have a sufficiently large width without the latter resulting in a corresponding width of the terminal housing. The width of the terminal housing is instead independent of the width of the clamp surface of the clamping element, since the ratchet arm extends essentially perpendicular to the crosswise extension of the terminal housing.

When plugging the terminal housing through the wall opening, the ratchet arm that is fastened to the lateral surface of the housing is pushed back through the inside edge of the wall opening in the direction of the lateral surface of the terminal housing, by which the terminal housing is clamped in the wall opening. In order to prevent an unauthorized disengaging of the lock and to secure the lead-through terminal in the wall opening, in addition a locking element is movably arranged on the terminal housing, which can be brought from a first position into a second position. In its first position, the locking element is arranged in such a way that the at least one sprung ratchet arm can be deflected in the direction of the lateral surface of the terminal housing, so that the terminal housing can be inserted into the wall opening. In its second position, however, the locking element is arranged partially between the free end of the sprung ratchet arm and the lateral surface of the terminal housing, so that the sprung ratchet arm cannot be deflected in the direction of the lateral surface of the terminal housing. The terminal housing is then fixed securely in the wall opening, since the clamping between the clamp surface of the at least one ratchet arm and the lateral inside edge of the wall opening cannot be achieved without the locking element being brought again into its first position.

In this case, the locking element is preferably arranged in such a way that it can be actuated from the side from which the fastening clamp is inserted into the wall opening. The assembly and disassembly of the fastening clamp in the wall opening is then carried out only from one side, in particular from the wiring side. From this side, the fastening clamp is first inserted into the wall opening before the fastening clamp is securely fixed in the wall opening by actuating the locking element and is prevented from unauthorized disengagement.

According to an advantageous configuration, the clamp surface on the free end of the sprung catch arm has multiple ridges, which are used for locking the fastening clamp in the wall opening. Since the ratchet arms are made sprung, moreover, certain tolerances in the width of the wall opening can be balanced.

As stated before, the locking element is located in its second position at least partially between the free end of the sprung ratchet arm and the lateral surface of the terminal housing, so that the sprung ratchet arm cannot be deflected in the direction of the lateral surface of the terminal housing. Preferably, in this case, the locking element has a chamfer on its side that faces the free end of the sprung ratchet arm. The locking element with its chamfer can thus be inserted especially easily between the free end of the sprung ratchet arm and the lateral surface of the terminal housing when the locking element is moved from its first position into its second position. The further the locking element is moved into its second position, the further the locking element goes with the chamfer between the free end of the ratchet arm and the lateral surface of the terminal housing. Thus, not only can the locking element prevent the ratchet arm from springing back in the direction of the lateral surface of the terminal housing, but rather also, moreover, the force with which the ratchet arm acts with its clamp surface against the lateral inside edge of the wall opening can be increased.

Preferably, in this case, the chamfer on the locking element has a gear, and the free end of the sprung ratchet arm has a corresponding counter gear on the side that faces the chamfer. An accidental sliding-back of the locking element from its second position into its first position is securely prevented, in particular even when dynamic stresses act on the fastening clamp, such as, for example, shock or vibration.

According to another advantageous configuration of the fastening clamp according to the invention, an insertion chamfer is formed in the terminal housing with which the terminal housing in the assembled state of the fastening clamp rests on the lower inside edge of the wall opening. The fastening clamp is thus additionally secured and held in the assembled state in the vertical direction. Moreover, the design of the insertion chamfer on the bottom of the terminal housing also serves to simplify the assembly of the fastening clamp in the wall opening. To this end, the fastening clamp is first mounted with the insertion chamfer on the lower inside edge of the wall opening and is then pivoted into the wall opening, wherein the sprung ratchet arm is pushed back through the inside edge of the wall opening in the direction of the lateral surface of the terminal housing and then locks the clamp surface with the inside edge of the wall opening.

In order to further simplify the insertion of the fastening clamp into the wall opening and to ensure a correct position of the fastening clamp in the wall opening, a contact surface is preferably formed on the terminal housing. In this case, the contact surface extends preferably perpendicular or approximately perpendicular to the lateral surface of the terminal housing. In the assembled state of the fastening clamp, the latter then is adjacent to the contact surface on the housing wall. The design of the contact surface thus also ensures that during assembly, the fastening clamp is always inserted sufficiently far into the wall opening.

At the outset, it was stated that the fastening clamp has at least one clamping element that is designed as a sprung ratchet arm. According to the preferred configuration, the fastening clamp has these two sprung ratchet arms, which in each case are fastened at their foot area to the terminal housing and both extend along the lateral surface of the terminal housing. The two ratchet arms are in this case arranged perpendicular to the extension direction of the fastening clamp adjacent to one another, i.e., above one another in a horizontal arrangement of the fastening clamp. In this way, an especially secure fixing of the fastening clamp in a wall opening is made possible, since a tilting of the fastening clamp around the longitudinal axis thereof is prevented. Moreover, the forming of two sprung ratchet arms with two clamp surfaces can then also ensure secure fastening of the clamp in the wall opening without having to select an overly wide ratchet arm, which could have a negative effect on its sprung property. So that the two sprung ratchet arms can be deflected independently of one another, in particular when the fastening clamp is pivoted into the wall opening, the two ratchet arms are arranged on the terminal housing at a distance to one another.

First, it was also stated that the locking element is preferably arranged in such a way that it can be actuated from the side, from which the fastening clamp is also inserted into the wall opening. So that the locking element can be moved by a mechanic easily from its first position into its second position or from its second position into its first position, an actuating element is provided according to another advantageous configuration, which element, on the one hand, is connected to the locking element and, on the other hand, is easily accessible to a mechanic.

According to a first advantageous configuration, as an actuating element, a screw is arranged in a hole in the terminal housing that is accessible from the outside and a thread is formed in the locking element into which the end of the screw is screwed. In this case, the hole is formed in such a way that the screw is secured in the longitudinal direction so that a turn of the screw produces a movement of the locking element. To this end, the end of the screw can be screwed into a screw nut, which is arranged in an anti-rotational way in the locking element.

According to another variant of the invention, a spring-tensioned locking unit is provided as an actuating element. The locking unit comprises a compression spring and a locking element, wherein the locking element has a locking section and a grip or actuating section. The locking section is arranged partially in a hole in the terminal housing. The compression spring is arranged with its one end on the locking section and with its other end on the locking element. The locking element can be moved from a first position in the extension direction of the fastening clamp into a second position, wherein the locking element in the second position exerts a force on the compression spring, so that the compression spring is tensioned and brings the locking element into its second position. The locking element can be stopped in its second position by rotating the locking element around its longitudinal axis, which runs parallel to the extension direction of the fastening clamp.

In this way, the actuating element can be pressed from the first position from the outside using the grip section into the interior of the terminal housing. Instead of a grip section, which can be actuated by hand, the locking element can also have an actuating section, which can be turned using a tool, for example a screwdriver. The locking element is then stopped in the second position by a turn of the grip or actuating section, for example by a quarter or half turn, and the locking element also remains in the second position.

In the case of another configuration of the variant of the invention, a locking hook is provided on the locking section. At least one groove that corresponds to the locking hook is provided in the hole, wherein the locking hook is engaged with the groove in the first position of the locking element and in the second position of the locking element has popped out of the hole and the groove in the direction of the interior of the terminal housing. The locking hook can be placed adjacent to a projection in the terminal housing by rotating the locking element around its longitudinal axis. The locking element can thus be moved like a key into the interior of the terminal housing. While the locking hook is engaged with the groove, the locking element cannot be rotated around its longitudinal axis. As soon as the locking hook pops out of the groove, the locking element can be rotated around its longitudinal axis. In this case, for example, the wall of the hole in the terminal housing can be used as a projection to which the locking hook is adjacent. The spring is tensioned in the second position, so that the locking hook is pressed automatically against the wall. Also conceivable, however, is a specially configured projection, which, for example, allows only a limited turning of the locking element because of a profile that is configured for the locking hook.

In the case of the two above-described variants of the invention, a movement of the locking element from its first position into its second position is carried out in that a mechanic implements a rotational movement on a screw or on the locking element. According to another alternative configuration of the invention, a lever system with two levers is provided as an actuating element, wherein with its first end, the first lever is hinged to the locking element, and with its second end, it is hinged to the first end of the second lever, which is mounted in a rotatable manner on the terminal housing. The second end of the second lever is accessible from the outside of the housing, so that the second lever can be easily pivoted by a mechanic from its first position into its second position. Because of the connection of the second lever via the first lever to the locking element, a pivoting of the second lever from its first position into its second position results, so that the locking element is brought from its first position into its second position.

According to an especially simple variant of the invention, an actuating section, which is connected to the locking element, is provided as an actuating element. The actuating section is in this case arranged and designed in such a way that the free end of the actuating section that points away from the locking element is accessible from the outside of the terminal housing, so that the locking element can be moved via the actuating section from its first position into its second position and from its second position into its first position. In this case, the actuating section can be actuated by hand in such a way that it can also be referred to as a grip section. As an alternative to this, the actuating section can also be designed in such a way that it is actuated using a tool, for example a screwdriver. The locking element and the actuating section can be either two separate components that are connected to one another, or the actuating section is integrally connected to the locking element. It is decisive only in that a movement of the actuating section also results in a corresponding movement of the locking element.

According to a preferred configuration of this variant, a sprung ratchet arm is provided, which with its one end is supported on the terminal housing and with its second, free end interacts with a mating latching element, which is formed on the locking element or on the actuating section. As a result, the locking element can be held securely in its second position when the free end of the ratchet arm and the mating latching element are engaged with one another. The ratchet arm is thus used as a type of nonreturn device, which prevents the locking element from accidentally moving from its second position into its first position, for example because of vibration or shock, by which the securing of the terminal housing in the wall opening would no longer be easily ensured.

The ratchet arm can be designed as a separate component or integral with the terminal housing. The ratchet arm can, for example, also be formed by a leg of a leg spring, which overall is secured in the terminal housing in such a way that only the leg that acts as a ratchet arm can be deflected; however, the entire leg spring cannot be moved in the terminal housing.

The mating latching element, with which the free end of the ratchet arm can interact, is preferably designed as a gear, which is arranged on a longitudinal edge of the locking element or the actuating section. To this end, a corresponding counter gear is then formed on the second, free end of the ratchet arm. If the gear on the locking element or actuating section has a certain longitudinal extension, the locking element can be secured in stages in various positions, depending on how far the free end of the locking element is inserted between the sprung ratchet arm and the lateral surface of the terminal housing. Preferably, the gear and the counter gear are oriented to one another in this case so that the locking element can be brought from its first position into its second position, even when the gear and the counter gear are engaged with one another, while the locking element can be brought from its second position into its first position only when the gear and the counter gear are not engaged with one another. As a result, the locking element can be easily moved into its second position, without the ratchet arm having to be deflected, in order to remove the free end of the ratchet arm from the gear on the locking element or on the actuating section.

With the above-described variants and configurations of an actuating element, in each case the option is provided for a mechanic to be able to bring the locking element precisely and yet easily and with little effort from its first position into its second position or from its second position again into its first position.

Unlike the above-described wall-lead-through terminals that are known from the state of the art, the securing of the modular terminal block in the wall opening is not carried out, in any case not primarily, via latching elements that are formed on the individual modular terminals, but rather via the fastening clamps that are usually arranged on both sides of the modular terminal block. This has the advantage that the modular terminals in the locked state can be fastened more easily in the wall opening than is the case with a modular terminal block, which is composed of multiple modular terminals, which in each case have a latching element for securing in the wall opening.

The invention therefore also relates to a component that consists of two fastening clamps according to the invention and multiple modular terminals that are arranged adjacent to one another, wherein the modular terminals are arranged between the fastening clamps and in each case have a terminal housing with at least two line terminal elements that are arranged therein. Such modular terminals are already known in principle from the state of the art in various variant embodiments. Preferably, the modular terminals are through terminals with a disconnect option, so that in each case, a test connector can be plugged into the individual modular terminals.

The modular terminals, which are used in the component in the case of the preferred embodiment of the invention, in each case have at least two busbars that are arranged in the terminal housing, which busbars in each case have a connecting section and a contact section, wherein the connecting sections in each case are assigned to a line terminal element, while the contact sections together form a sprung contact area for receiving the plug of a test connector or operating connector. So that such a plug can be inserted into the sprung contact area, in each case an opening is formed in the terminal housings of the modular terminal, which opening is accessible from one side, the operator side. Such modular terminals are known from, for example, German Patent DE 10 2011 113 333 B4 and corresponding U.S. Patent Application Publication 2014/0329397 A1, and German Patent Application DE 10 2015 114 186 A1 and corresponding U.S. Patent Application Publication 2018/0261934 A1.

The electrical modular terminals, which together form the modular terminal block, are in each case designed like a disk. So that multiple modular terminals together form a modular terminal block, the individual modular terminals are connected to one another; to do this, the modular terminals are locked with one another via corresponding latching elements that are formed in the terminal housing. The latching elements in this case preferably consist of latching pins that are arranged on the one side of the terminal housing and corresponding latching recesses that are formed on the other side of the terminal housing. In order to connect the fastening clamps to the adjacent modular terminals, latching elements are also preferably formed on the terminal housings of the fastening clamps, which latching elements correspond to the latching recesses and/or latching pins in the terminal housing of the modular terminals.

In detail, there is now a wide variety of options for configuring and further developing the fastening clamp and the component according to the invention. To this end, reference is made both to the following claims and to the subsequent description of preferred embodiments with reference to the accompanying drawings.

DETAILED DESCRIPTION OF THE DRAWINGS

Figure 1:
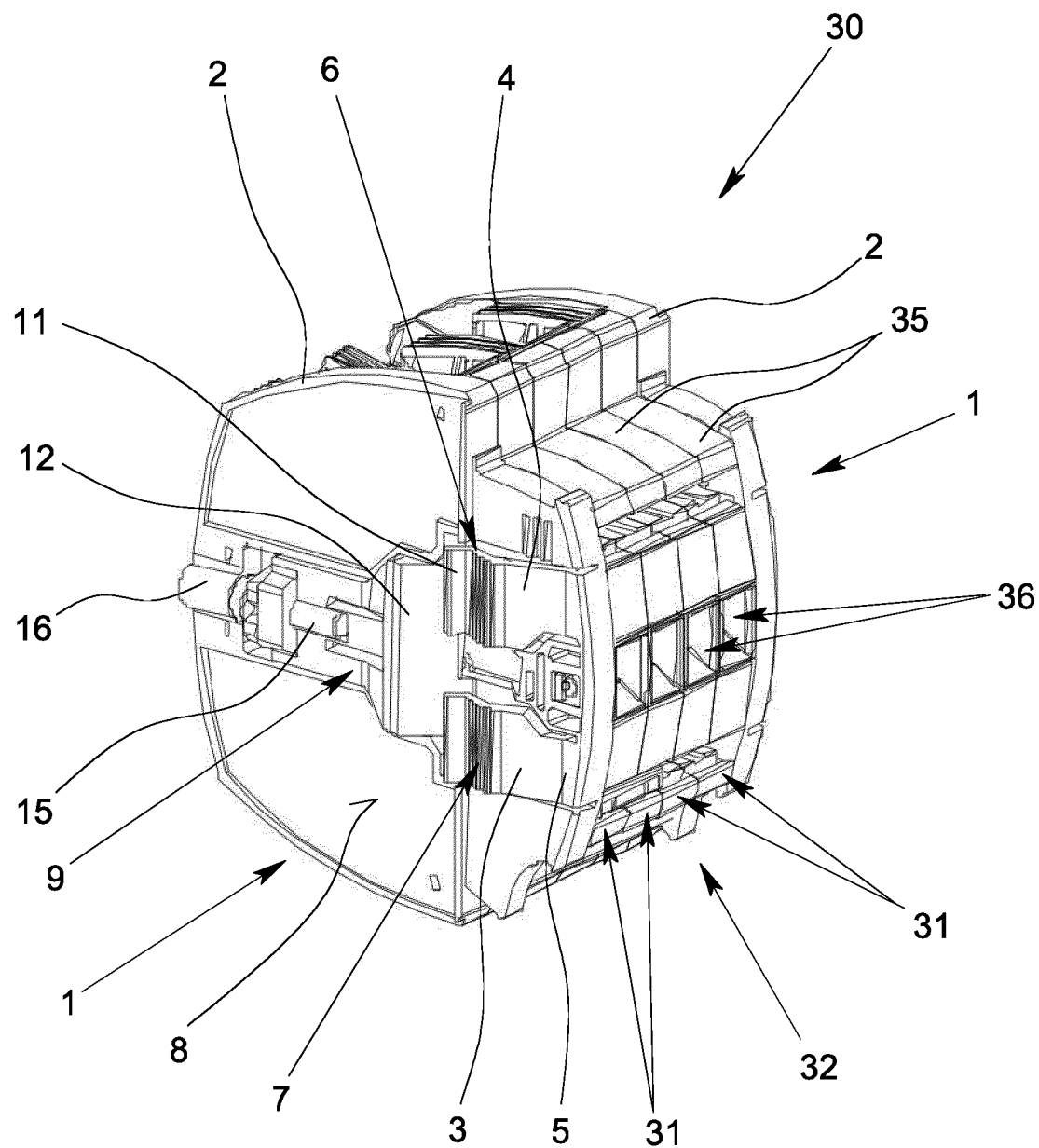
FIG. 1 is a perspective view of a component according to the invention, consisting of a modular terminal block and two fastening clamps, seen obliquely from the operator side.
Figure 2:
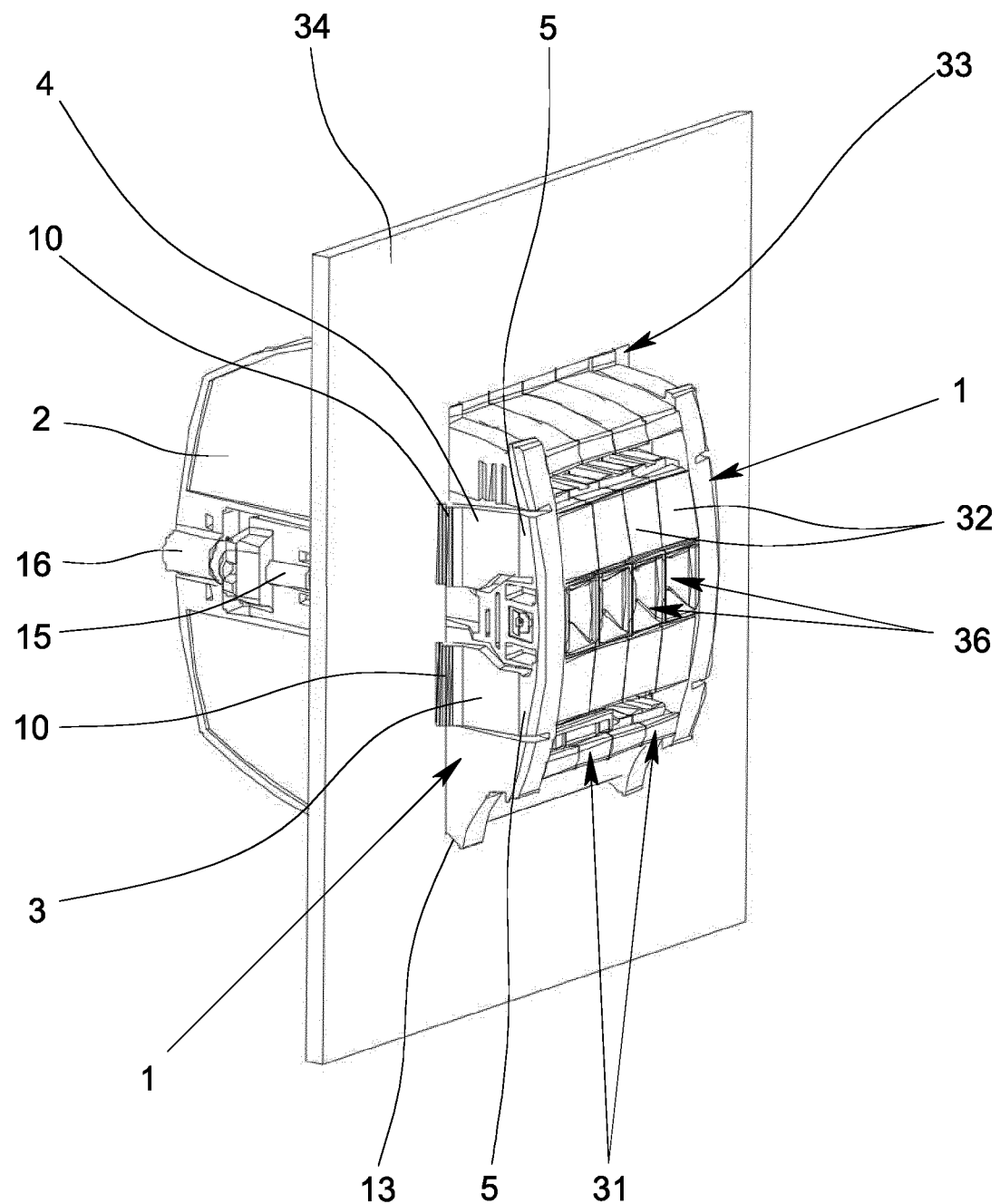
FIG. 2 is a perspective view of the component according to FIG. 1, inserted into a wall opening.

The figures show various variant embodiments of the fastening clamp 1 according to the invention as well as, in FIGS. 1 and 2, a component 30 that is comprised of two fastening clamps 1 and multiple, in this case four, modular terminals 31 that are arranged adjacent to one another, which terminals together form a modular terminal block 32. The fastening clamps 1 are used to secure the modular terminal block 32 in a wall opening 33 of a housing wall 34, in which, for example, this is the door of a switch cabinet.

Figure 3:
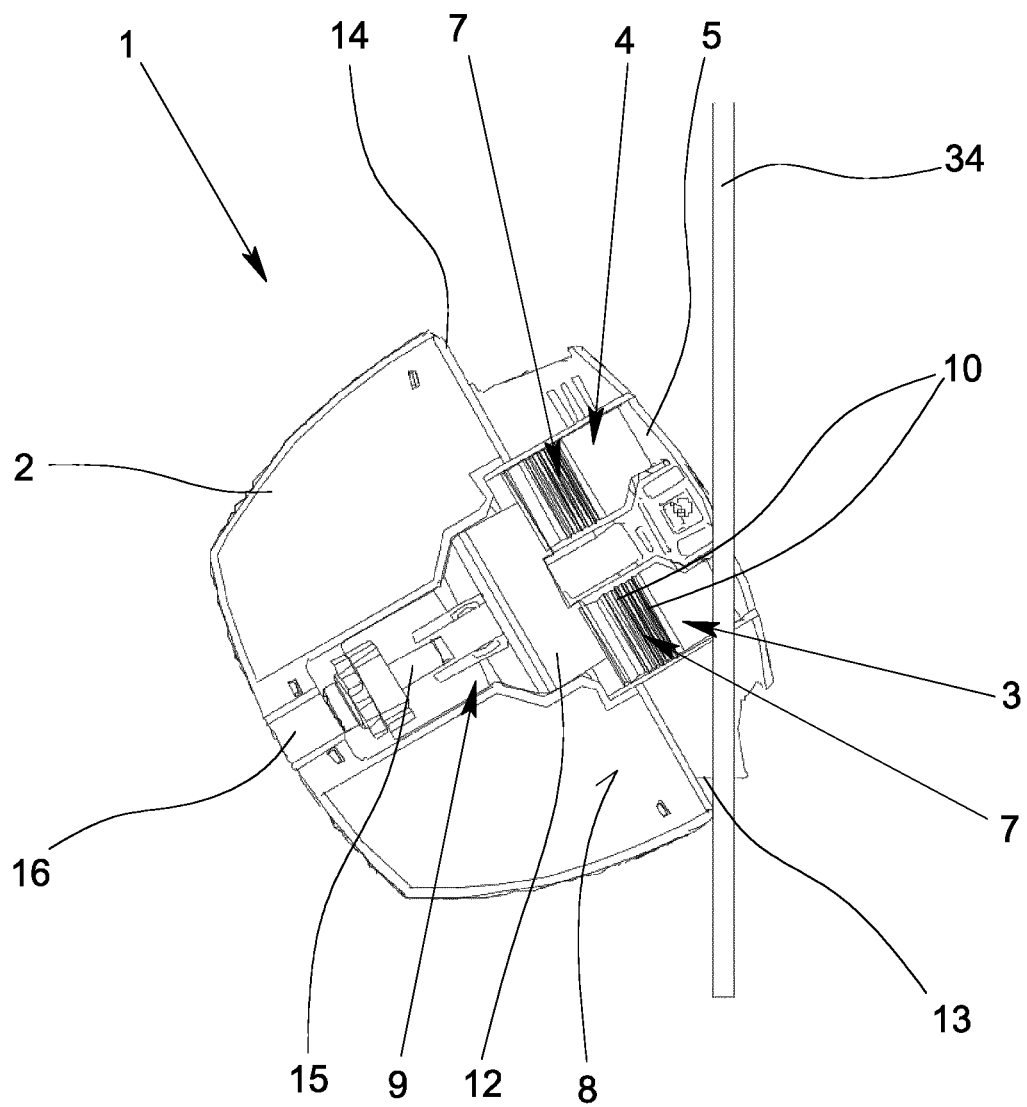
FIG. 3 is a perspective view of a fastening clamp according to the invention during insertion into a wall opening, seen from the side.
Figure 4:
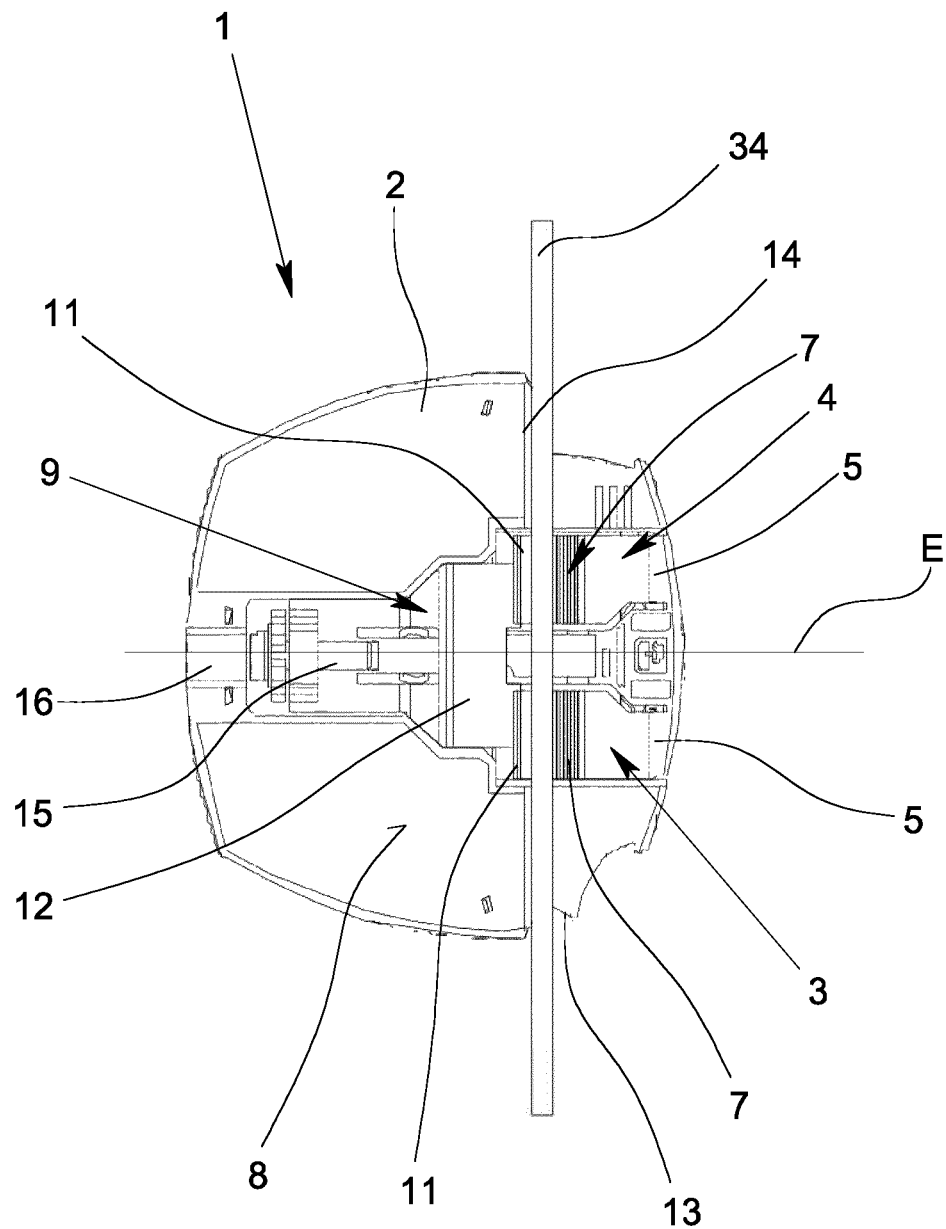
FIG. 4 shows the fastening clamp according to FIG. 3, inserted into the wall opening.

The fastening clamp 1 that is depicted in, for example, FIGS. 3 and 4 from the side has a terminal housing 2, on which two sprung ratchet arms 3, 4 are formed as clamping elements. In this case, the foot area 5 of the ratchet arms 3, 4 is fastened to the terminal housing 2, while the free end 6 of the ratchet arms 3, 4 is formed as a clamp surface 7. As can be seen in particular from the perspective depiction according to FIG. 1, the ratchet arms 3, 4 extend along the lateral surface 8 of the terminal housing 2, so that the clamp surface 7 in the assembled state of the fastening clamp (FIG. 2) acts against a lateral inside edge of the wall opening 33. The two ratchet arms are in this case arranged adjacent to one another perpendicular to the extension direction E of the fastening clamp 1, thus arranged above one another in the orientation of the fastening clamp 1 according to FIG. 1.

To secure the fastening clamp 1 in the wall opening 33, a locking element 9 is arranged to move on the terminal housing 2, which element can be brought from a first position (FIGS. 5a, 6a, 7a, 10) into a second position (FIGS. 5b, 6b, 7b, 8, 9). In the first position of the locking element 9, the sprung ratchet arms 3, 4 can be deflected in the direction of the lateral surface 8 of the terminal housing 2, so that the ratchet arms 3, 4 are deflected inward through the inside edge of the wall opening 33 while being inserted through the terminal housing 2 through the wall opening 33. If the fastening clamp 1 according to FIG. 4 is inserted into the wall opening 33, the fastening clamp 1 is secured in the wall opening 33 in such a way that the sprung ratchet arms 3, 4 in each case press with their clamp surface 7 against the lateral inside edge of the wall opening 33. Ridges 10 that are formed on the clamp surfaces 7 in this case ensure that the terminal housing 2 locks into its position in the wall opening 33. The position of the terminal housing 2 in the wall opening 33 is in addition secured in such a way that the outer end 11 of the ratchet arms 3, 4 is bent outward. In this case, the outer end 11 is arranged on the one side of the housing wall 34, the wiring side, and the rest of the sprung ratchet arms 3, 4 is arranged on the other side of the housing wall 34, the operator side.

In order to prevent unauthorized disengagement of the lock between the clamp surfaces 7 of the ratchet arms 3, 4 and the lateral inside edge of the wall opening 33, the locking element 9 must be moved into its second position. To this end, the locking element 9 has a chamfer 12 on the side that faces the free end 6 of the sprung ratchet arms 3, 4, which chamfer 12 is arranged in the second position of the locking element 9 between the free end 6 of the latching elements 3, 4 and the lateral surface 8 of the terminal housing 2. As a result, the ratchet arms 3, 4 are locked in their clamping position, so that they cannot be deflected in the direction of the lateral surface 8 of the terminal housing 2.

Based on FIGS. 3 and 4, it is evident how the fastening clamp 1 or the component 30 is inserted into the wall opening 33 on the housing wall 34. Formed on the bottom of the terminal housing 2 is an insertion chamfer 13, with which the terminal housing 2 is first mounted on the lower inside edge of the wall opening 33. Then, the fastening clamp 1 or the component 30—in the depiction according to FIG. 3—is pivoted clockwise in the wall opening 33, wherein—as already previously stated—the ratchet arms 3, 4 are deflected by the lateral inside edge of the wall opening 33 in the direction of the lateral surface 8 of the terminal housing 2. The contact surface 14 that is formed on the terminal housing 2, which surface extends perpendicular to the lateral surface 8 of the terminal housing 2, is used in this case as a stop when pivoting the fastening clamp 1 in the wall opening 33, in such a way that the fastening clamp 1 is already inserted far into the wall opening 33 until the contact surface 14 is adjacent to the housing wall 34 that runs parallel thereto.

FIGS. 5 to 8 show various variant embodiments of the fastening clamp 1 according to the invention, which are essentially only distinguished from one another in how the locking element 9 can be brought from its first position into its second position. It is common to all embodiments in this case that the fastening clamp 1 is first pivoted from the one side, the wiring side, into the wall opening 33, as is depicted in FIGS. 3 and 4. Then, using an actuating element, the locking element 9 is brought from its first position into its second position, wherein the actuating element is also accessible from the wiring side. As a result, it is ensured that the lock between the ratchet arms 3, 4 and the lateral inside edge of the wall opening 33 is not disengaged from the second side, the operator side, and then the fastening clamp 1 or the component 30 can be pushed out from the wall opening 33.

Figure 5:
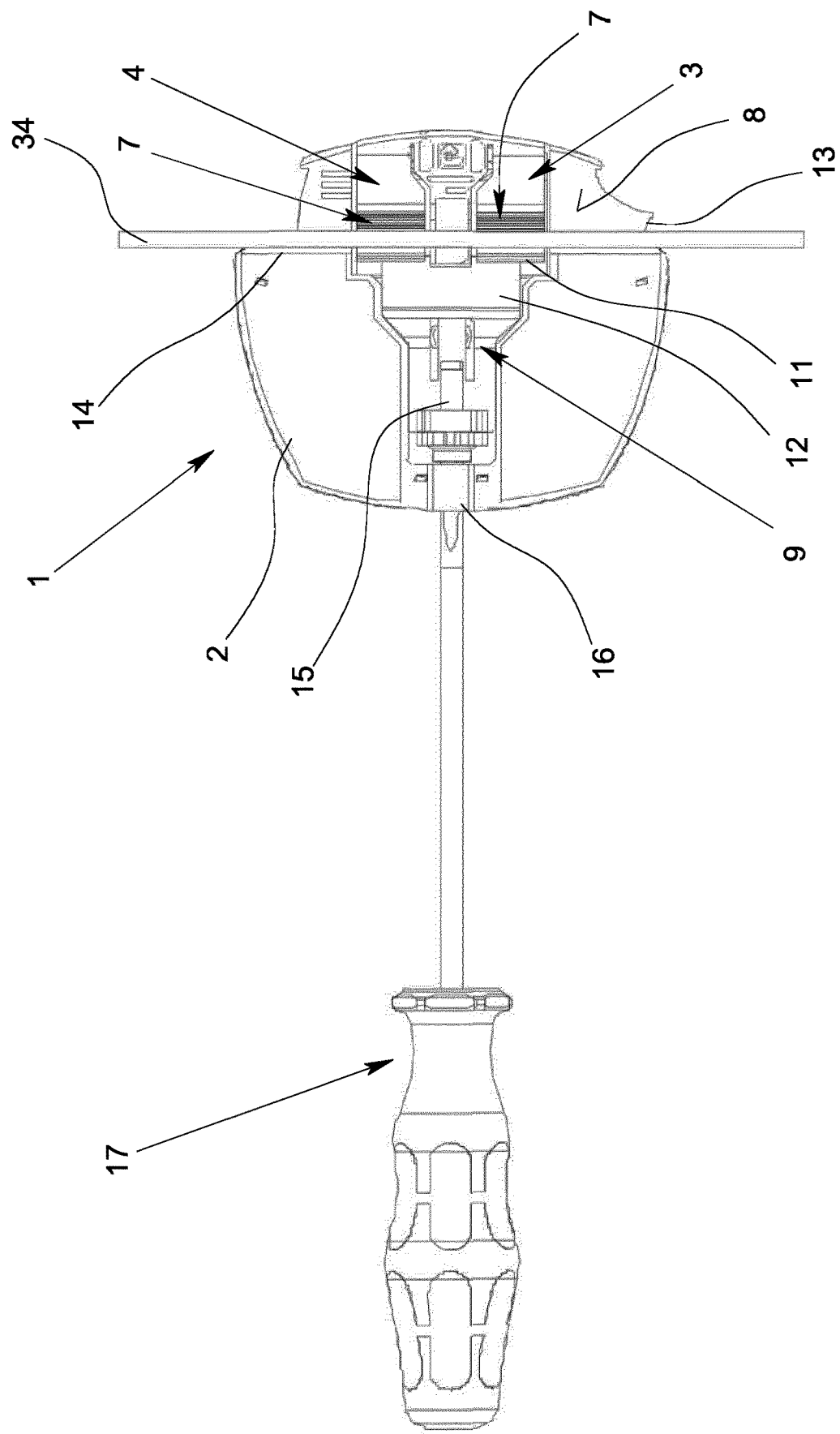
FIG. 5 shows the fastening clamp according to FIG. 4, with a screwdriver for moving the locking element from its first position into its second position.

In the first variant embodiment according to FIG. 5, a screw 15 is provided as an actuating element, which screw is arranged in the terminal housing 2 in a hole 16 that is accessible from the outside. In this case, the screw 15 is connected at its end to the locking element 9 in such a way that a turning of the screw 15 produces an axial movement of the locking element 9. To this end, in the locking element 9, a screw nut that corresponds to the screw 15 can be arranged in an anti-rotational way, into which screw nut the end of the screw 15 is screwed. In addition, the hole 16 has a contact shoulder for the screw 15, to which the screw head is adjacent, by which the screw 15 is secured in the longitudinal direction. Turning of the screw 15 by means of a screwdriver 17 does not result in a longitudinal movement of the screw 15, but rather in a movement of the locking element 9 in the longitudinal direction of the screw 15. As a result, the locking element 9 can be moved with its chamfer 12 between the free end 7 of the ratchet arms 3, 4 and the lateral surface 8 of the terminal housing 2, by which the ratchet arms 3, 4 are locked in their position, in which the clamp surfaces 7 of the ratchet arms 3, 4 clamp against the lateral inside edge of the wall opening 33. To this end, if the fastening clamp 1 is to be removed again from the wall opening 33, the screw 15 has to be turned in the opposite direction using the screwdriver 17, by which the locking element 9 is pulled back from its second position into its first position. Subsequently, the ratchet arms 3, 4 can then be deflected in the direction of the lateral surface 8 of the terminal housing 2, so that the fastening clamp 1 can be plugged through the wall opening 33 in the direction of the wiring side.

Figure 6A:
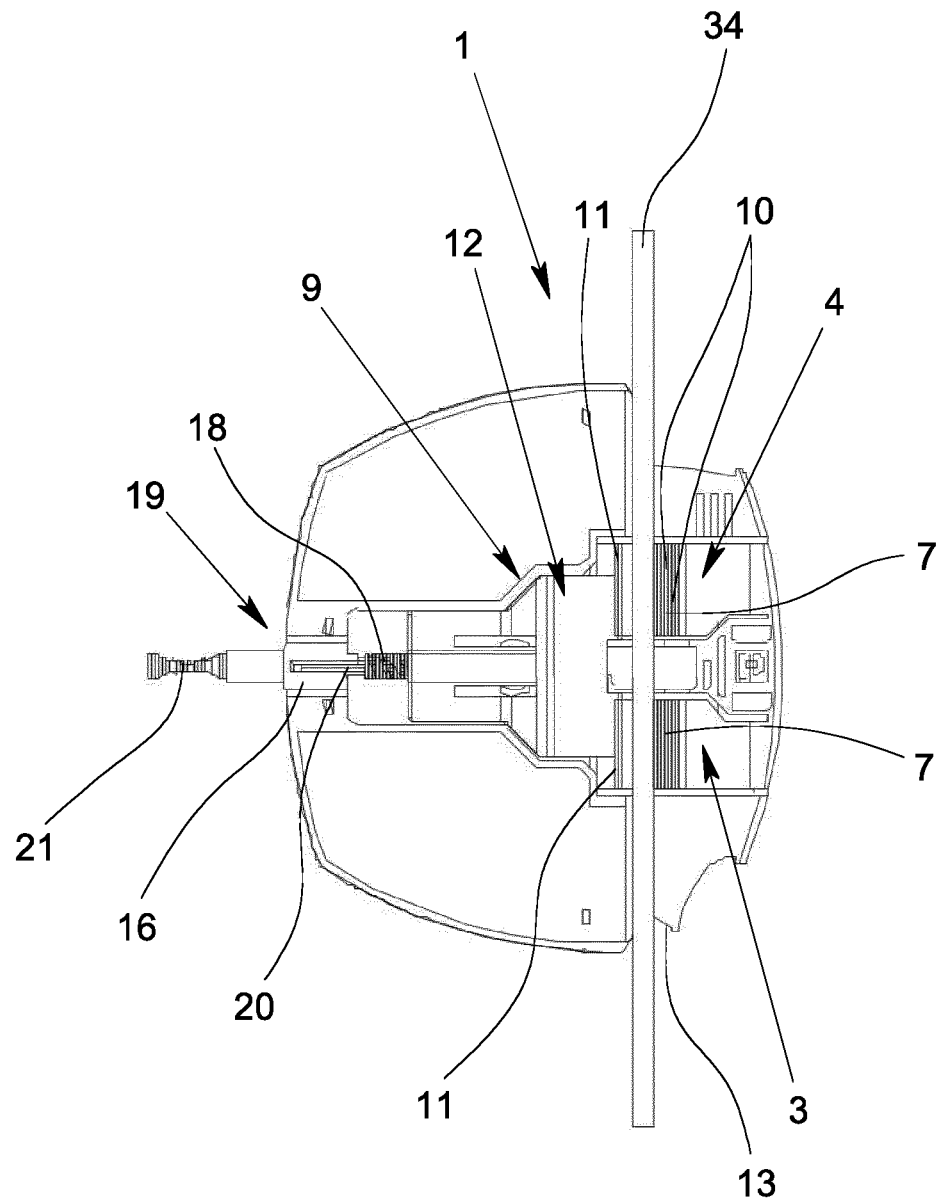
FIGS. 6a & 6b show a variant of the fastening clamp according to FIG. 5 with a spring-pretensioned locking unit for moving the locking element from its first position into its second position.
Figure 6B:
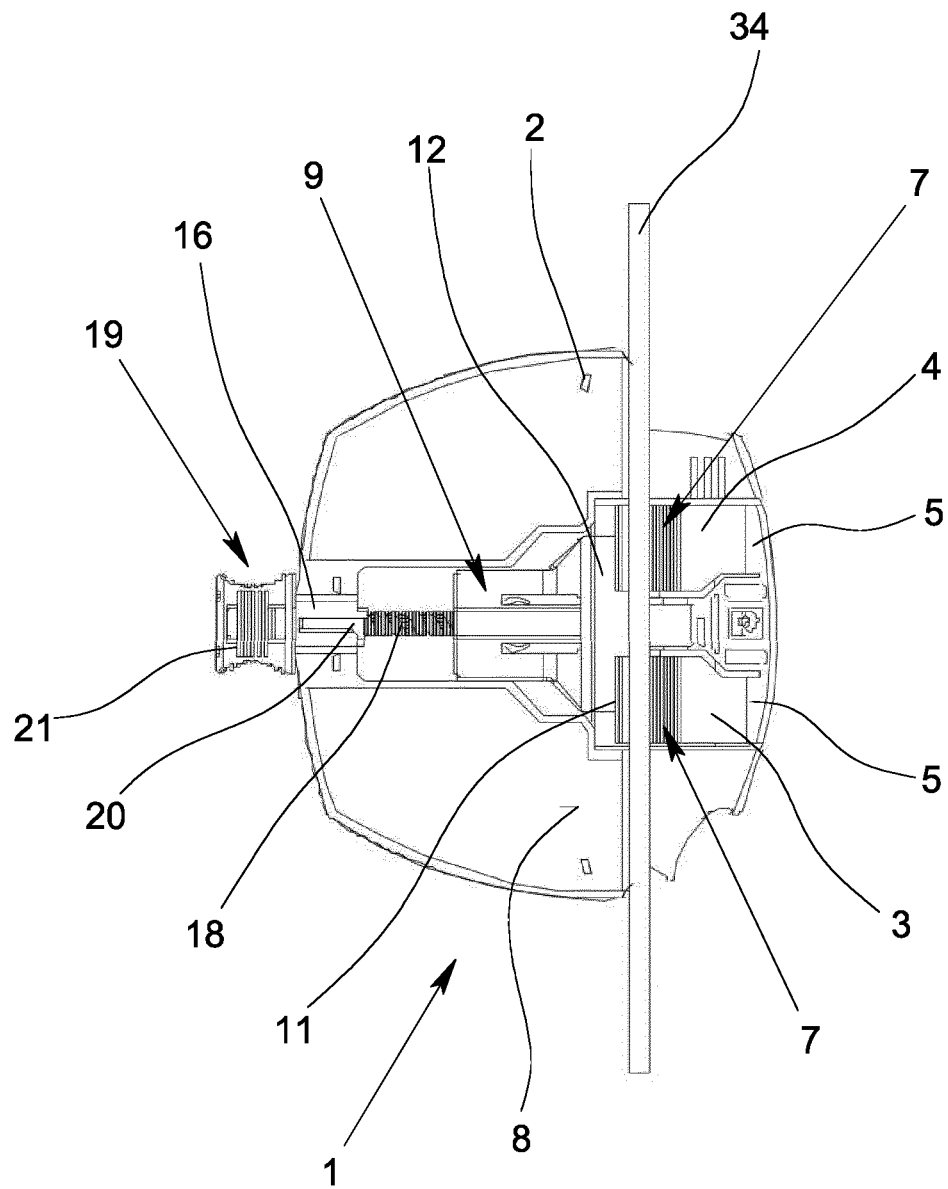

In the variant embodiment according to FIGS. 6a and 6b, a spring-tensioned locking unit is provided as an actuating element. The locking unit comprises a compression spring 18 and a locking element 19, wherein the locking element has a locking section 20 and a grip section 21. The locking section 20 is arranged in the hole 16 in the terminal housing 2. The compression spring 18 is arranged in turn with its one end on the locking section 20 and its other end on the locking element 9. Using the grip section 21, a mechanic can press the locking element 19 from a first position in the extension direction E of the fastening clamp 1 into a second position in the terminal housing 2. In this case, the locking element 19 exerts a force on the compression spring 18, and the latter is tensioned. Because of the tensioning of the compression spring 18, the locking element 9 is also moved into its second position, by which the entire system is tensioned via the compression spring 18.

In the second position, the mechanic can rotate the locking element 19 around its longitudinal axis and thus lock it. The locking of the locking element 19 is carried out by a locking hook, which is supported on the wall of the hole 16 in the terminal housing 2 after the locking element 19 is turned. So that the locking element 19 can slide through the hole 16 despite the locking hook, in addition a groove that corresponds to the locking hook is provided. In order to unlock the locking element 19 again, the locking element 19 is rotated around its longitudinal axis until the locking hook pivots again into the groove and can slide back through the hole 16.

Figure 7A:
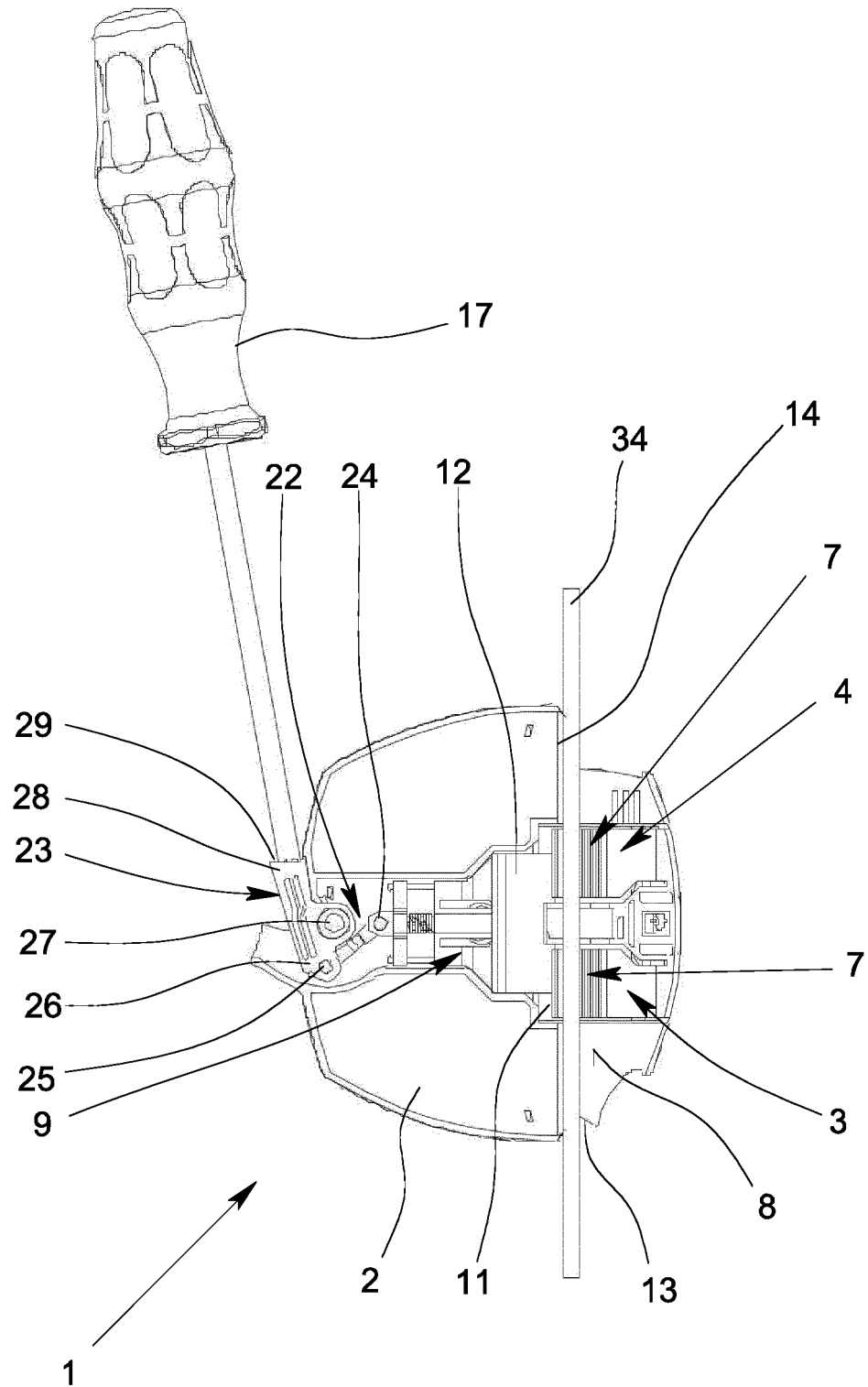
FIGS. 7a & 7b show another variant of the fastening clamp according to FIG. 5 with a lever system for moving the locking element from its first position into its second position.
Figure 7B:
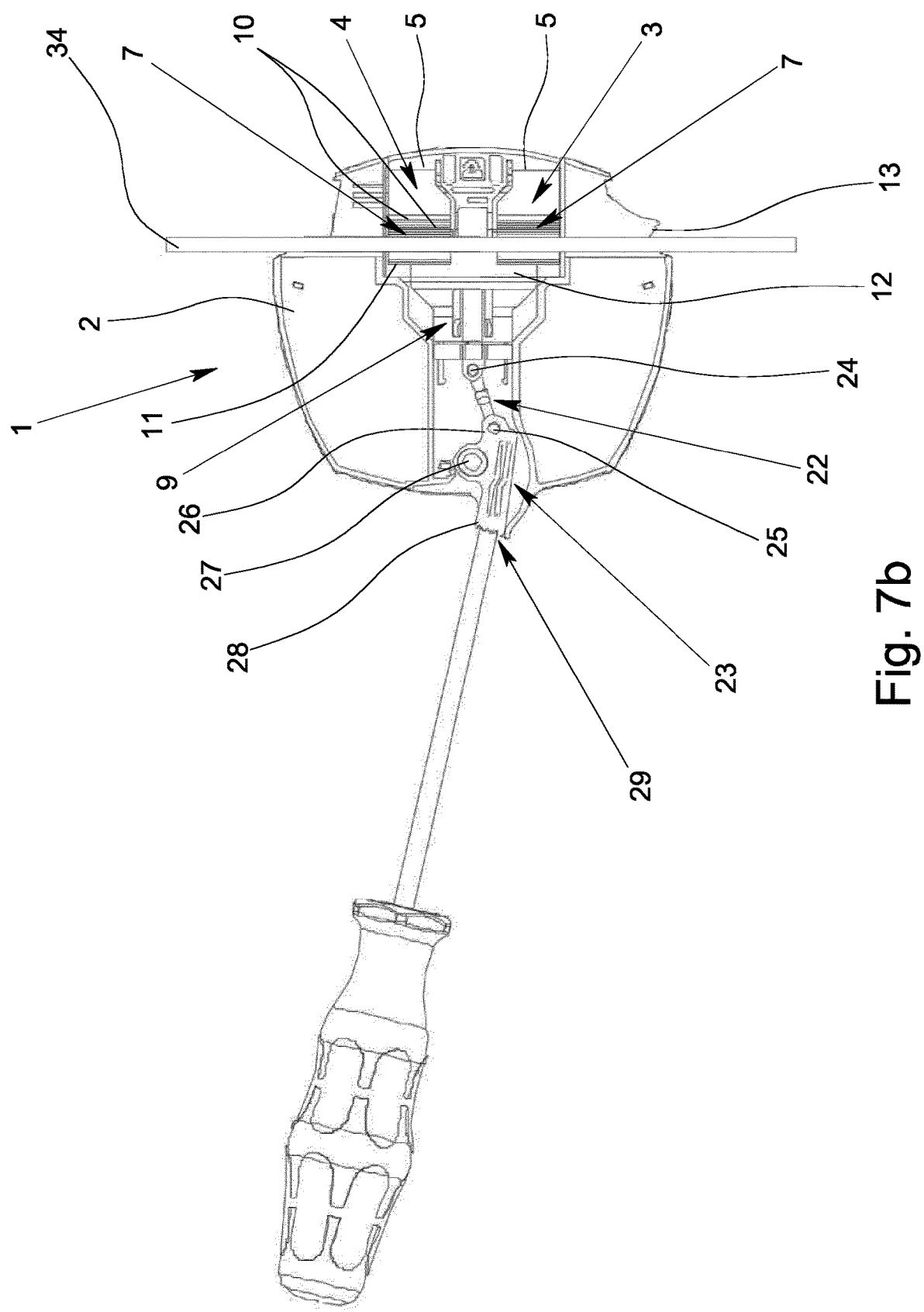

In the embodiment according to FIGS. 7a and 7b, the actuating element is designed as a lever system that has two levers 22, 23, which are hinged together. In detail, with its first end 24, the first lever 22 is hinged to the locking element 9, and with its second end 25, it is hinged to the first end 26 of the second lever 23. The second lever 23 is mounted to rotate via a pivot pin 27 that is formed on the terminal housing 2, wherein the second end 28 of the second lever 23 is accessible from the outside. In the second end 28 of the second lever 23, in addition a recess 29 is formed, into which the bit of a screwdriver 17 can be inserted, so that using the screwdriver 17, the second lever 23 can be pivoted easily from its first position (FIG. 7a) into its second position (FIG. 7b). The above-described arrangement of the two levers 22, 23 in this case ensures that when the second lever 23 is pivoted from its first position into its second position, the locking element 9 is also brought from its first position into its second position. Conversely, when the second lever 23 is pivoted from its second position into its first position, the locking lever 9 can be pulled back with little effort from its second position into its first position, in which the locking lever 9 again releases the ratchet arms 3, 4, so that the fastening clamp 1 can be removed from the wall opening 33.

Figure 8:
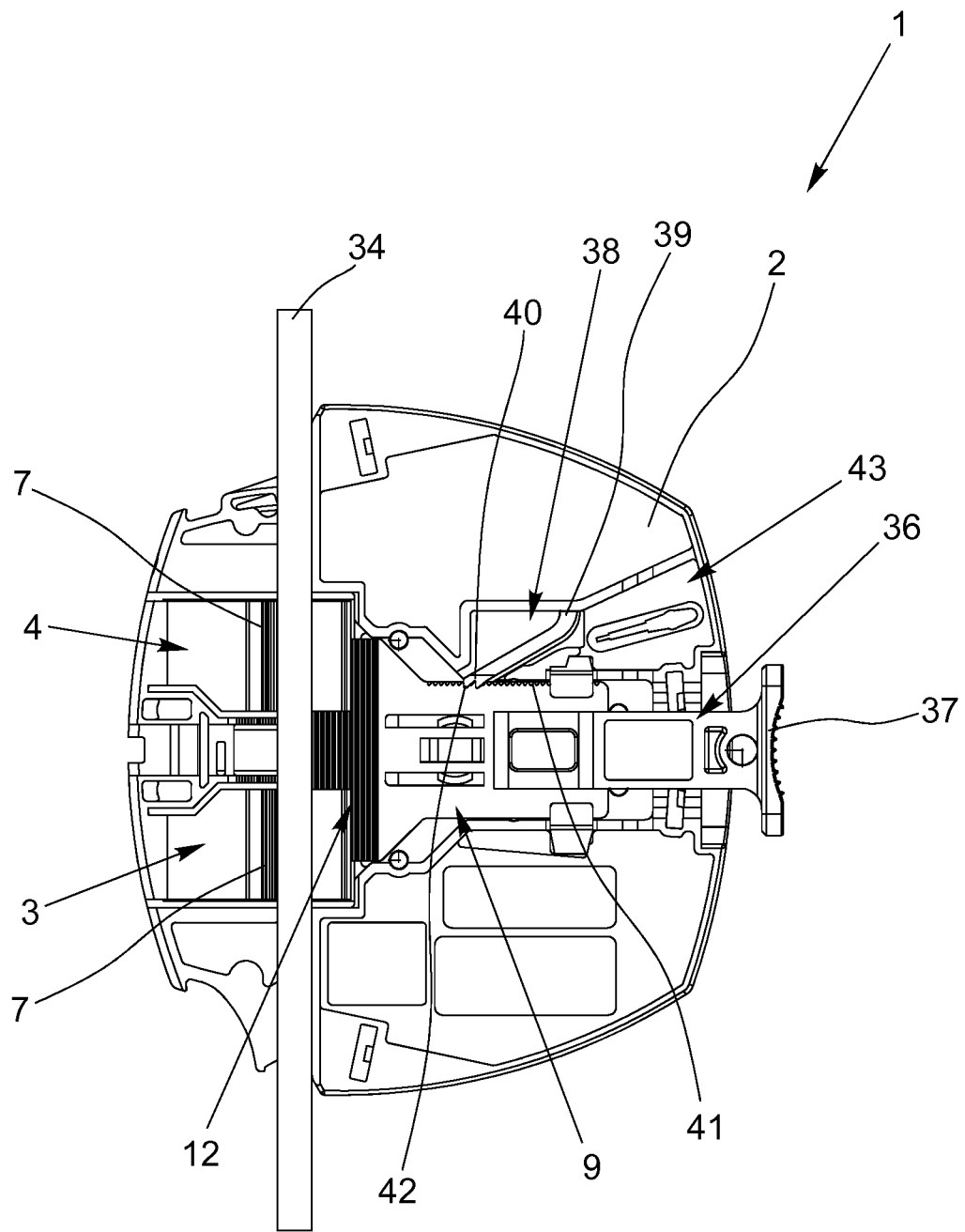
FIG. 8 shows a third variant of the fastening clamp with an actuating section that can be actuated by hand for moving the locking element, locked in its second position.
Figure 9:
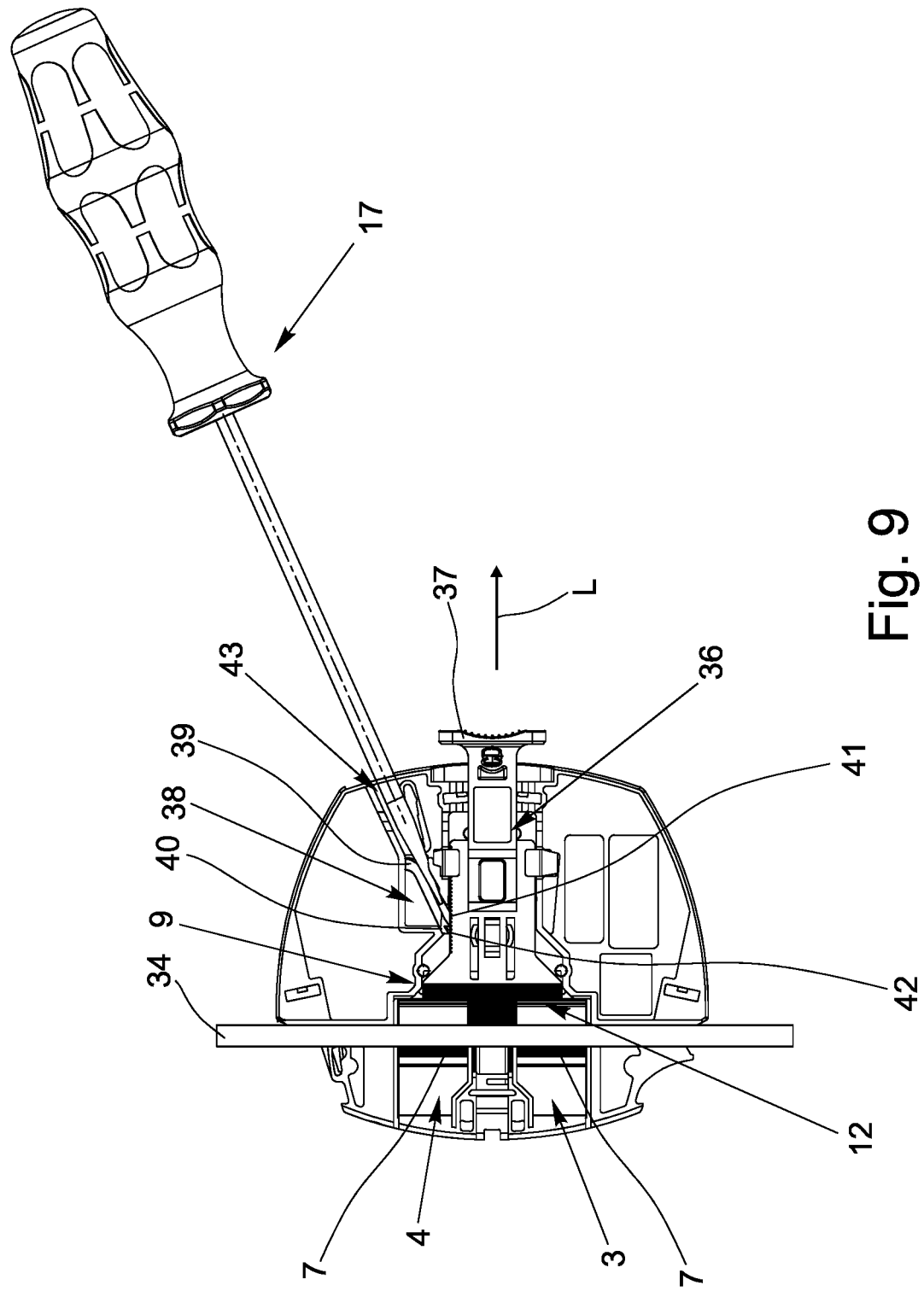
FIG. 9 shows the fastening clamp according to FIG. 8 with disengaged locking.
Figure 10:
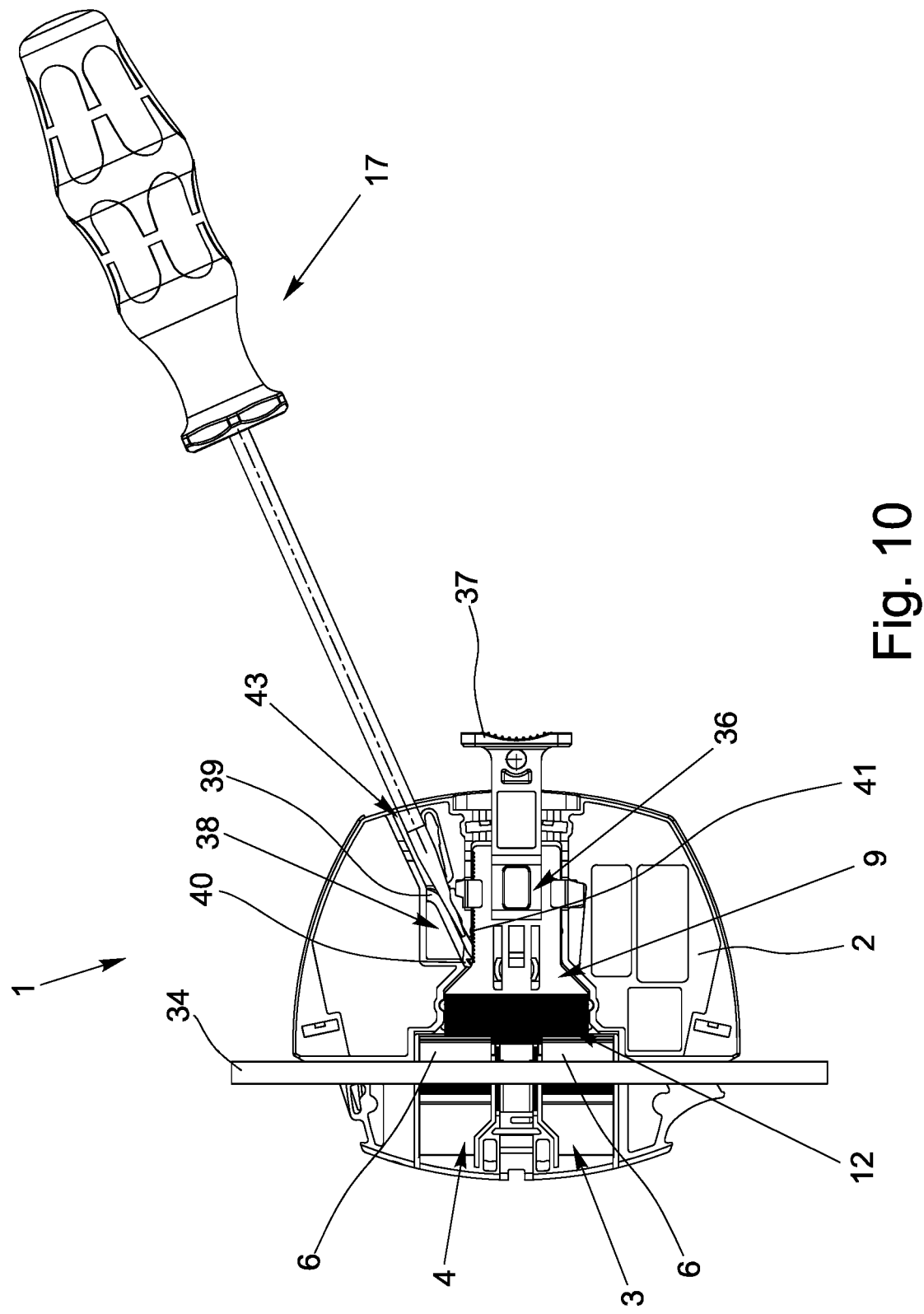
FIG. 10 shows the fastening clamp according to FIG. 8 with the locking element in its first position.

FIGS. 8-10 show another variant embodiment, in which an actuating section 36 is provided as an actuating element. The actuating section 36 is in this case integrally connected to the locking element 9, wherein the free end 37 of the actuating section 36 that points away from the locking element 9 projects from the terminal housing 2, so that a mechanic can easily actuate it with one or two fingers. To move the locking element 9 from its first position (FIG. 10) into its second position (FIG. 8), the free end 37 of the actuating section 36 has to be pressed only with one finger in the direction of the terminal housing 2. So that the locking element 9 can be secured in its second position and cannot accidentally slip back into its first position, an additional nonreturn device is provided. To this end, a sprung ratchet arm 38 is arranged in the terminal housing 2, which arm is supported with its one end 39 on the terminal housing 2. The second, free end 40 of the ratchet arm 38 interacts in the locked position with a mating latching element, which is formed on the locking element 9. In the depicted embodiment, the mating latching element is formed by a gear 41 on a longitudinal edge of the locking element 9, in which a counter gear 42 is formed on the second, free end 40 of the ratchet arm 38. When the gear 41 and the counter gear 42 are engaged with one another, the locking element 9 is thus locked securely in its second position (FIG. 8).

In order to move the locking element 9 into the first position, first the lock has to be disengaged; to do this, the free end 40 of the ratchet arm 38 has to be withdrawn with its counter gear 42 from the gear 41 on the locking element 9, i.e., the sprung ratchet arm 38 has to be deflected. This can be carried out especially easily using a screwdriver 17, whose bit is inserted into a recess 43, provided for this purpose, in the terminal housing 2, as is depicted in FIG. 9. In this way, the ratchet arm 38 is deflected in such a way that the lock is disengaged. Then, a mechanic can easily use two fingers to pull on the actuating section 36 in the direction L, by which the locking element 9 is moved from its second position in the direction of its first position. In this disengaged position of the locking element 9, which is depicted in FIG. 10, the fastening clamp 1 can then be removed again from the wall opening 33 of a housing wall 34 in order to exchange, for example, a defective modular terminal block 32 and to replace it with a new one.

As already previously stated, FIGS. 1 and 2 show a component 30 that consists of two fastening clamps 1 and four modular terminals 31, which are locked together to form a modular terminal block 32. To this end, the terminal housings 35 of the modular terminals 31 have mating latching elements, in particular latching pins and latching recesses, by means of which the disk-shaped modular terminals 31 can be locked together. The fastening of the fastening clamps 1 to the adjacent modular terminals 31 is carried out preferably also via corresponding latching elements, which are formed in the terminal housings 2 of the fastening clamps 1 or in the terminal housings 35 of the modular terminals 31.

As is evident from FIGS. 1 and 2, the individual modular terminals 31 in each case have an opening 36, into which the plug of a test connector or operating connector can be inserted. The openings 36 are in this case accessible from the operator side in the assembled state of the component 30. In the terminal housings 35 of the modular terminals 31, in each case two line terminal elements and at least two busbars, which in each case have a connecting section and a contact section, are arranged. Regarding the possible actual structure of the individual modular terminals 31 and the arrangement and configuration of the busbars, reference is made to German Patent Application DE 10 2015 114 186 A1 and corresponding U.S. Patent Application Publication 2018/0261934 A1, by way of example.

What is claimed is:

1. Fastening clamp for securing a modular terminal block that has multiple modular terminals in a wall opening of a housing wall, comprising a terminal housing and at least one clamping element, wherein the clamping element has a clamp surface,
    wherein the clamping element is a sprung ratchet arm which is fastened at a foot area to the terminal housing, and the clamp surface is formed on a free end,
    wherein a ratchet arm extends along a lateral surface of the terminal housing, in such a way that the clamp surface in an assembled state of the fastening clamp acts against one edge of the wall opening, and
    wherein a locking element is arranged to move on the terminal housing, and can be brought from a first position into a second position, wherein in the first position of the locking element, the sprung ratchet arm can be deflected in a direction of the lateral surface of the terminal housing, while the locking element in its second position is arranged partially between the free end of the sprung ratchet arm and the lateral surface, in such a way that the sprung ratchet arm cannot be deflected in the direction of the lateral surface of the terminal housing.

2. Fastening clamp according to claim 1, wherein the locking element has a chamfer on a side that faces the free end of the sprung ratchet arm.

3. Fastening clamp according to claim 2, wherein the chamfer on the locking element has a gear, and the free end of the sprung ratchet arm has a corresponding counter gear on sides that face the chamfer.

4. Fastening clamp according to claim 1, wherein an insertion chamfer is formed in the terminal housing, with which the terminal housing rests on a lower inside edge of the wall opening in the assembled state of the fastening clamp.

5. Fastening clamp according to claim 1, wherein a contact surface is formed on the terminal housing, which contact surface extends perpendicular to the lateral surface of the terminal housing.

6. Fastening clamp according to claim 1, wherein two sprung ratchet arms are formed, which in each case are fastened at a foot area to the terminal housing and which both extend along the lateral surface of the terminal housing, wherein the two ratchet arms are arranged adjacent to one another perpendicular to a length direction of the fastening clamp.

7. Fastening clamp according to claim 1, wherein using an actuating element, the locking element can be brought both from the first position into the second position and from the second position into the first position.

8. Fastening clamp according to claim 7, wherein the actuating element is a screw arranged in a hole that is accessible from outside of the terminal housing and wherein a thread is formed in the locking element into which the end of the screw is screwed, wherein the hole is formed in such a way that the screw is secured in a longitudinal direction so that turning the screw produces an axial movement of the locking element.

9. Fastening clamp according to claim 7, wherein the actuating element comprises a spring-tensioned locking unit, wherein the locking unit comprises a compression spring and a locking element, wherein the locking element has a locking section and a grip section or an actuating section, wherein the locking section is arranged partially in a hole in the terminal housing,
    wherein one end of the compression spring is arranged on the locking section and with a second end on the locking element,
    wherein the locking element is movable from a first position in the lengthwise direction of the fastening clamp into a second position,
    wherein the locking element in the second position exerts a force on the compression spring in such a way that the compression spring is tensioned and brings the locking element into its second position, and
    wherein the locking element is stoppable in its second position by rotating the locking element around a longitudinal axis thereof.

10. Fastening clamp according to claim 9, wherein a locking hook is provided on the locking section, wherein at least one groove that corresponds to the locking hook is provided in the hole, wherein the locking hook is engaged with the groove in the first position of the locking element and in the second position of the locking element pops out of the hole and the groove in the direction of the interior of the terminal housing, and wherein the locking hook is placeable adjacent to a projection in the terminal housing by rotating the locking element around its longitudinal axis.

11. Fastening clamp according to claim 7, wherein the actuating element comprises a lever system with two levers, wherein a first end of the first lever is hinged to the locking element, and a second end is hinged to the first end of the second lever, wherein the second lever is mounted to rotate on the terminal housing and the second end of the second lever is accessible from the outside, and wherein the second lever is pivotable from a first position into a second position, wherein the locking element in the first position of the second lever is located in its first position and in the second position of the second lever is located in its second position.

12. Fastening clamp according to claim 11, wherein a recess for inserting an auxiliary means is formed in the second end of the second lever.

13. Fastening clamp according to claim 7, wherein the actuating element comprises an actuating section that is connected to the locking element, and wherein a free end of the actuating section facing away from the locking element is accessible from outside of the terminal housing.

14. Fastening clamp according to claim 13, further comprising a sprung ratchet arm supported at one end on the terminal housing and interacts with a second, free end with a mating latching element which is formed on the locking element or on the actuating section in such a way that the locking element locks in its second position when the free end of the ratchet arm and the mating latching element are engaged with one another.

15. Fastening clamp according to claim 14, wherein the mating latching element is formed as a gear and a counter gear is formed on the second, free end of the ratchet arm, wherein the gear and the counter gear are aligned with one another in such a way that the locking element can be brought from its first position into its second position even when the gear and the counter gear are engaged with one another, while the locking element can be brought from its second position into its first position only when the gear and the counter gear are disengaged with one another.

16. Component that comprises two fastening clamps and a modular terminal block that has multiple modular terminals that are arranged adjacent to one another, wherein the modular terminals are arranged between the fastening clamps and in each case have a terminal housing with at least two conductor connection elements that are arranged therein, wherein each of the fastening clamps comprises:
- a terminal housing and at least one clamping element, wherein the clamping element has a clamp surface,
- wherein the clamping element is a sprung ratchet arm which is fastened at a foot area to the terminal housing, and the clamp surface is formed on a free end,
- wherein a ratchet arm extends along a lateral surface of the terminal housing, in such a way that the clamp surface in an assembled state of the fastening clamp acts against one edge of the wall opening, and
- wherein a locking element is arranged to move on the terminal housing, and can be brought from a first position into a second position, wherein in the first position of the locking element, the sprung ratchet arm can be deflected in a direction of the lateral surface of the terminal housing, while the locking element in its second position is arranged partially between the free end of the sprung ratchet arm and the lateral surface, in such a way that the sprung ratchet arm cannot be deflected in the direction of the lateral surface of the terminal housing.

17. Component according to claim 16, wherein each of the fastening clamps is connected mechanically to an adjacent one of the modular terminals via latching elements that are formed on their terminal housings via latching pins or latching recesses that correspond to latching pins or latching recesses formed in the terminal housing.

\* \* \* \* \*